United States Patent
Flores et al.

(10) Patent No.: US 10,906,247 B2
(45) Date of Patent: Feb. 2, 2021

(54) METHOD AND SYSTEM FOR GENERATING AND PRINTING THREE DIMENSIONAL BARCODES

(71) Applicant: Xerox Corporation, Norwalk, CT (US)

(72) Inventors: Eliud Robles Flores, Rochester, NY (US); Robert Bruce Anderson, Jr., Syracuse, NY (US); Timothy P. Foley, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/827,517

(22) Filed: Nov. 30, 2017

(65) Prior Publication Data

US 2018/0082163 A1 Mar. 22, 2018

Related U.S. Application Data

(63) Continuation of application No. 14/635,529, filed on Mar. 2, 2015, now Pat. No. 9,864,940.

(51) Int. Cl.

| *B29C 64/386* | (2017.01) |
|---|---|
| *G06K 19/06* | (2006.01) |
| *G06K 1/12* | (2006.01) |
| *B33Y 50/02* | (2015.01) |
| *B33Y 80/00* | (2015.01) |

(52) U.S. Cl.
CPC ............ *B29C 64/386* (2017.08); *G06K 1/121* (2013.01); *G06K 19/06037* (2013.01); *G06K 19/06159* (2013.01); *B33Y 50/02* (2014.12); *B33Y 80/00* (2014.12)

(58) Field of Classification Search
USPC ...................................................... 235/462.01
See application file for complete search history.

(56) References Cited

U.S. PATENT DOCUMENTS

| 7,267,280 | B2 * | 9/2007 | Lubow | ................. G06K 7/1434 235/454 |
|---|---|---|---|---|
| 7,806,339 | B2 * | 10/2010 | Ferren | ..................... G07D 7/04 235/490 |
| 8,070,473 | B2 | 12/2011 | Kozlak | |
| 8,091,042 | B2 | 1/2012 | Chen et al. | |
| 8,750,598 | B2 | 6/2014 | Bonner et al. | |
| 2005/0010776 | A1 | 1/2005 | Kenen et al. | |
| 2012/0305003 | A1 | 12/2012 | Mark | |
| 2013/0015596 | A1 | 1/2013 | Mozeika et al. | |
| 2013/0305380 | A1 | 11/2013 | Diehl et al. | |

FOREIGN PATENT DOCUMENTS

WO 2007079549 A1 7/2007

* cited by examiner

*Primary Examiner* — Rafferty D Kelly
(74) *Attorney, Agent, or Firm* — Fox Rothschild LLP (57) ABSTRACT

A three-dimensional barcode comprising a three-dimensional barcode structure, at least a part of which is printed on a surface of an object. The barcode structure includes encoded information, and at least part of the encoded information is embedded in a z-dimension perpendicular to the surface of the object.

70 Claims, 7 Drawing Sheets

METHOD AND SYSTEM FOR GENERATING AND PRINTING THREE DIMENSIONAL BARCODES

RELATED APPLICATIONS AND CLAIM OF PRIORITY

This patent document claims priority to, and is a continuation of, U.S. patent application Ser. No. 14/635,529, filed Mar. 2, 2015. The disclosure of the priority application is fully incorporated by reference.

BACKGROUND

Figure 1:
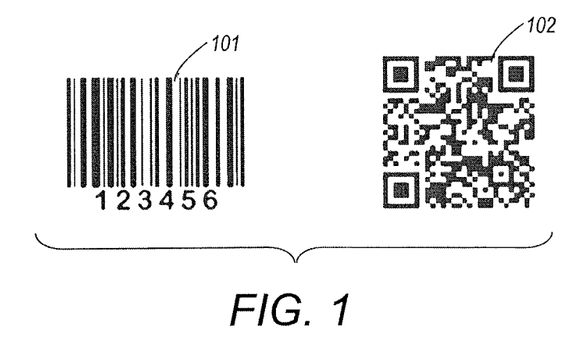
FIG. 1 depicts prior art examples of a one-dimensional and a two-dimensional barcode, respectively.

Barcodes have become a widely accepted method for storing information about objects such as identification information, parts, prices, serial numbers, and many other bits of data. A one-dimensional and/or two-dimensional barcode symbol is typically a machine-readable array of encoded elements that are printed directly on an object surface or on labels affixed to an object surface. Barcode symbols are typically read by optical techniques, such as by readers implementing scanning laser beams, handheld wands, or mobile phone cameras. Barcode symbols typically comprise bars and spaces with bars of varying widths representing strings of binary ones and spaces of varying widths representing binary zeros. An example of a one-dimensional barcode 101 is shown in FIG. 1.

A QR code is a type of two-dimensional or matrix barcode that may be readable by electronic devices having a camera, such as smart phones, computing devices, specialized scanners, and so on. The matrix barcode may include black blocks or modules arranged in a pattern against a white background. The information encoded within the matrix barcode may be text, uniform resource locator (URL), alphanumeric, numeric and other data. An example of a two-dimensional barcode 102 is shown in FIG. 1B.

Prior art methods exist to add color to traditional one-dimensional barcodes and two-dimensional barcodes (printed using two-dimensional printers) in order to increase the data capacity. However, the data capacity of colored barcodes is still very limited and thus the amount of information that can be stored in bar codes is limited to tracking information, identification information, and the like. Moreover, the existing methods do not enable barcodes to include information that is not easily accessible or visible to a user.

With the advent of three-dimensional (3D) printing technologies, it may be desirable to introduce new ways for increasing the data capacity of barcodes, and for including sensitive non-public information, such that the barcodes can store more information such as manufacturing information, tracking information for manufacturing parts, and 3D design files for the object. This document describes methods and systems that are directed to at least some of the problems described above.

SUMMARY

In some embodiments, a three-dimensional barcode includes a three-dimensional barcode structure, at least a part of which is printed on a surface of an object. The barcode structure may include encoded information such that at least part of the encoded information is embedded in a z-dimension perpendicular to the surface of the object.

In certain embodiments, a first portion of the encoded information may include first bars of a first height with respect to the surface, a second portion of the encoded information may include second bars of a second height with respect to the surface, and the first bars and second bars exhibit a single color. The first height and the second height are chosen to be close enough to each other so that the barcode structure may be detected by a 3D scanning device but is imperceptible to an unaided human eye. Optionally, the first bars and the second bars may exhibit a first color, and a third portion of the encoded information may include bars of a second color positioned at either the first height or the second height with respect to the surface.

In some embodiments, the first portion of the encoded information may include first bars of a first color, the second portion of the encoded information may include second bars of a second color, and the heights of the first bars and the second bars are close enough to each other so that the barcode structure may be detected by a 3D scanning device but is imperceptible to an unaided human eye.

In certain other embodiments, a first portion of the encoded information may include first pixels represented as structures of a first height with respect to the surface, a second portion of the encoded information may include second pixels represented as structures of a second height with respect to the surface, and the structures of the first height and the structures of the second height exhibit a single color. The first height and the second height are chosen to be close enough to each other so that the barcode structure may be detected by a 3D scanning device but is imperceptible to an unaided human eye. Optionally, the structures of the first height and the structures of the second height may exhibit a first color, and a third portion of the encoded information may include structures of a second color positioned at either the first height or the second height.

In some embodiments, the information embedded in the z-direction comprises non-public information. The non-public information may include at least one of the following: information relating to printing of an object, information relating to printing of parts of an object, secondary manufacturing information, or information defining the sequencing of parts in manufacturing an object. Alternatively and/or additionally, the information embedded in the z-direction may include unencrypted information.

In some embodiments, part of the three-dimensional barcode that is printed on the surface of the object may include a two-dimensional barcode symbol and/or a one-dimensional barcode symbol.

In at least one embodiment, the information embedded in the part of the three-dimensional barcode that is printed on the surface of the object comprises public information. The public information may include at least one of the following: a part number, part identification information, inventory information, user manual, safety information, or licensing information. Alternatively and/or additionally, the information embedded in the part of the three-dimensional barcode that is printed on the surface of the object comprises encrypted information.

In an embodiment, the z-dimension perpendicular to the surface of the object corresponds to raised areas on the surface of the object and/or pits inside the object. Optionally, the z-dimension perpendicular to the surface of the object includes bars of one or more of the following shapes: cylindrical, square, rectangular, or conical.

In an embodiment, the z-dimension perpendicular to the surface of the object may represent numerical binary values.

DETAILED DESCRIPTION

For purposes of this document, the following terms shall have the following meanings:

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" refers to a device that includes a processor and non-transitory, computer-readable memory. The memory may contain programming instructions that, when executed by the processor, cause the computing device or electronic device to perform one or more operations according to the programming instructions. As used in this description, a "computing device" or an "electronic device" may be a single device, or any number of devices having one or more processors that communicate with each other and share data and/or instructions. Unless the context specifically dictates otherwise, the term "processor" will include embodiments having a single processor, as well as embodiments in which multiple processors collectively perform various steps of a process. Examples of computing devices and/or electronic devices include personal computers, servers, mainframes, gaming systems, televisions, and portable electronic devices such as smartphones, personal digital assistants, cameras, tablet computers, laptop computers, media players and the like.

As used herein, a traditional one-dimensional barcode is a representation of data as printed or structural or displayed elements in the x-direction or the y-direction. A two-dimensional barcode, such as data matrix and QR codes, and comprises printed or structural or displayed elements in the x-direction and the y-direction. The terms "three dimensional barcode" and "3D barcode" refer to a one-dimensional and/or two-dimensional barcode that includes a differential height component (z-direction) incorporated into the array of encoded elements, as an additional dimension. (In this context, the x, y, and z directions are perpendicular to each other).

In some embodiments, producing a 3D barcode may refer to creating or engraving a 3D barcode directly on the surface of an object. Alternatively and/or additionally, producing a 3D barcode may refer to creating or engraving a 3D barcode on a substrate that may be affixed on an object. Examples of the substrate may include, without limitation, metal sheet, paper, cloth, plastic or other pliable or rigid material suitable for having one or more symbol characters printed or formed thereon.

Barcode symbology refers to the mapping between data and barcode, and it refers to a set of rules and definitions specific to the barcode that defines the data or information represented by the barcode symbol based on the specific arrangement and characteristics of bars or elements in a barcode symbol. Arrangements and characteristics may include, without limitation, size, shape, height, color, and width of the elements as well as spaces between the elements determined by the symbology used. For example, in a traditional barcode a narrow bar or space might represent a 0 while a wide bar or space might represent a 1, or a long bar might represent a 0 while a short bar might represent a 1. Further, "symbol character" refers to the unique geometric shapes or bar and space patterns or elements used in a bar code symbology to represent particular data characters. For example, in the 16-bit character encoding standard Unicode, the data character "A" is represented by the 16-bit code "0041" in hexadecimal notation and "65" in decimal. The data character "A" is represented as "10" in the traditional bar code symbology type Code 93. The representation 10 in Code 93 (one-dimensional) corresponds to a symbol character having a pattern of a two module width bar followed by: a single module width space, a single module width bar, a single module width space, a single module width bar, and a three module width space. This disclosure describes a unique third dimension wherein the symbol characters may include a height dimension.

The terms "three dimensional printing" and "3D printing" refer to one of various processes of forming a three-dimensional object from a model or other electronic data source through a process by which multiple layers of a build material are formed and cured, typically under control of a computing device. Examples of 3D printing processes include, without limitation, stereolithography, selective laser sintering, fused deposition modeling and laminated object manufacturing.

The terms "three dimensional printing device" and "3D print device" refer to a device or system that is capable of performing a 3D printing process. A 3D print device will include a processor. The processor will implement programming instructions, typically using parameters from a data file, that cause an applicator of the device to selectively deposit layers of a build material (such as a photopolymer or powder), and that cause a radiation generating device (such as a laser or heat source) to selectively apply energy to help cure the deposited layers of build material. As used throughout this disclosure, the terms "three-dimensional printing system," "three-dimensional printer," "3D print device," "3D printing system," and "3D printer" refer to any now or hereafter known 3D printing system or printer.

The terms "three dimensional scanning device" and "3D scanner" refer to a device or system that is capable of performing scanning data that is encoded in a 3D barcode. A 3D print device will include a processor and one or more sensors that can sense physical attributes of the objects. The sensors may include, for example, an image sensor (camera), sonic sensor (e.g., sonar), materials or chemical properties sensor, a magnetic sensor, an x-ray device, a combination of an infrared camera with an infrared light source, an air-knife type of reader, or other sensors. The processor will implement programming instructions, typically using parameters from a data file that cause the sensor to collect data that is embedded in a 3D barcode. As used throughout this disclosure, the terms "three-dimensional printing system," "three-dimensional scanner," "3D scanning device," "3D scanning system," and "3D scanner" refer to any now or hereafter known 3D printing system or printer.

Figure 2:
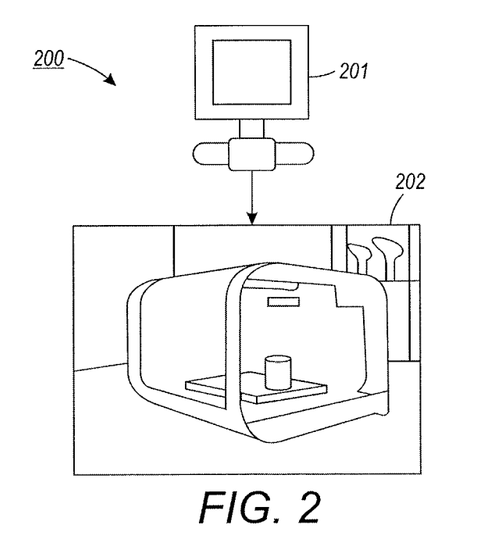
FIG. 2 illustrates a schematic representation of a system for producing a three dimensional bar code, according to an embodiment.

FIG. 2 shows a schematic representation of a system embodiment for manufacturing a 3D object(s) with a 3D barcode (not shown here) using a 3D print device 202. The 3D print device 202 may be in communication with a computing device 201 having a memory device for storing computer-aided design (hereinafter "CAD") software capable of designing and causing the 3D print device to create objects by 3D printing. In some embodiments, the computing device 201 may be integral with the 3D print device 202. Alternatively, the computing device 201 and 3D print device 202 may be separate devices that share data files by one or more communication networks, or by a physical or manual file transfer process. Typically, CAD files contain specifications, from which geometry of an object is generated, which in turn allow for a representation of the object to be generated. Geometry and representation may be stored in a single CAD file or multiple ones. The CAD software module includes graphic tools for representing the modeled objects to the designers. These tools are dedicated to the display of complex objects. A CAD system manages models of objects, which are stored in electronic files. The methods disclosed herein can also be implemented as stand-alone software not dependent on pre-existing CAD software or CAD framework. Such a program may implement its own graphical user interface ("GUI"), and may use standard 3D software libraries for 3D model generation. Alternatively, such a program may implement its own libraries for generating 3D models. The use of CAD software in this disclosure is by way of example, and a person skilled in the art will understand that other software and/or design tools may be used without diverting from the principles of the disclosure.

The computing device may also include one or more modules for enhancing the functionalities of the original CAD software such that it may allow a user to create a 3D barcode in accordance with the principles disclosed here. The module(s) may be a software application including functionality to allow a user to generate data from information and determine barcode symbology, and embed the data and/or information in the form of a 3D barcode in an object and/or a substrate. In some embodiments, the module may be stored in a memory device of the computing device 201. Alternatively, the module may be provided on a separate device (such as a memory stick) or as a cloud-based software application that may share data files, instructions or both with the CAD software by one or more communication networks, or by a physical or manual file transfer process. In certain embodiments, the data may be extracted from a one-dimensional and/or two-dimensional barcode and embedded in a 3D barcode.

Figure 3:
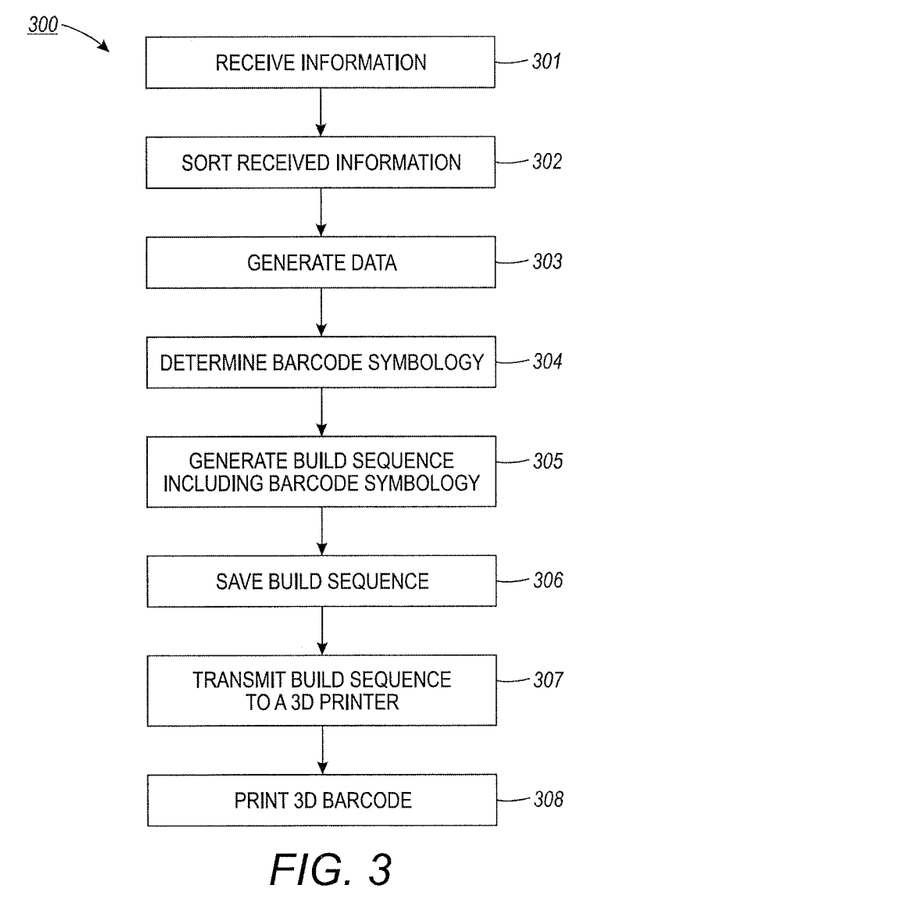
FIG. 3 depicts a flow chart example of a process for producing a three dimensional barcode, according to an embodiment.

With reference to the flowchart of FIG. 3, a method for creating a 3D barcode by providing instructions to a processor of the computing device is disclosed. The system may receive information to be included in the 3D barcode in step 301. In an embodiment, a user may provide the information through a user interface. In certain embodiments, the processor may extract the information automatically from databases related to an object on which the 3D barcode will be engraved and/or affixed. In some embodiments, the information itself may be embedded in the 3D barcode. In certain other embodiments, at least a part of the information may be stored at an external location and pointer(s) the external location may be embedded in the 3D barcode. The pointer may be in the form of a hyperlink to a website, or other similar forms.

The information may provide instructions and include details relating to the object on which the 3D barcode will be engraved and/or affixed. Types of information may include, without limitation, information required for printing copies of the object; identification information; manufacturing license information; intellectual property information; quality control information; composition information; safety information; information relating to post-build operations; information for customer use; information for commercial functions; information for consumer safety; spare parts lists; information for security functions; and combinations thereof.

Example of information required for printing copies of the 3D object may include, without limitation structural parameters, design files, CAD files, and/or other such information for manufacturing copies of the object (as discussed above with respect to the reference information). Manufacturing information may also include information needed to license the right to manufacture the object, and/or information needed to purchase the license. For example, the 3D barcode may hold links to the CAD files for printing the object, copyright servers, authorization servers, and/or a path to a server that may enable the transfer of funds into the design owner's bank account.

Examples of identification information may include, for the object, customer identification (serial numbers), batch and lot numbers, purchase information, job queue orders, manufacturing date, facility, and other similar types of identification details. In one embodiment, the information may also provide instructions for handling the produced 3D object after the build operation is complete.

Quality control information may include information relating to the year of manufacture, model number, manufacturing plan, and manufacturing options. In some embodiments, the quality control information may further include information such as printer serial number, chemical formula of media, batch number, humidity, temperature, time of manufacture, operator number, calibration number, and common faults and their severity.

The information may also include information related to the various parts required for printing copies of an object. Examples may include, without limitation, part numbers, order information, website data, organizational information, or other such information needed for ordering, printing, or customizing parts. At least part of this information may be included in 3D barcodes to be engraved and/or affixed directly to the respective parts.

Next, in step 302, the processor may apply sorting rules to sort the information received into information that is readily available to a user (public information) and information that is not readily available to a user (non-public information). In an embodiment, the module may receive sorting rules from a user, via a user interface and instruct a processor to sort the information based on the logic provided by the user. In certain other embodiments, the processor may sort the information based on logic that is pre-programmed into the system, or logic that it may retrieve from a data file. Examples of such logic may include (i) a rule set requiring that information relating to manufacturing or printing of the object and/or parts of the object, such as design files object and/or parts, CMYK composition of the parts, secondary manufacturing operations and manufacture date, be non-public information, (ii) a rule requiring that information that is distributed to customers and users such as a user manual, safety information, and licensing information be public information, (iii) rule set requiring that information relating to ordering or customization of parts, such as part numbers, part identification information, inventory information, and part order information be public information, and (iv) rule set requiring that information defining the number of parts and/or sequencing in the manufacturing process be non-public information. The above logic is by way of example, and other sorting logics are within the scope of this disclosure. In some embodiments, a user may be able to customize the default sorting rules.

In certain embodiments, the system may further encrypt at least part of the information using encryption techniques known to those skilled in the art.

In step 303, the processor may generate data from the received information by encoding information in a format that may be represented by a barcode. Any known methods and applications (such as XML) may be used to create the data. The data may also include metadata for facilitating the conversion of data back to information.

The format or type of data generated may vary depending on, without limitation, the volume of information, the volume of data, type of scanner to be used to extract data from the 3D barcode, or the barcode symbology defining the types of barcode elements to be used for representing the data (discussed below). Types of data may include, without limitation, American Standard Code for Information Exchange (ASCII) character set, integers (16-bit, 32-bit, etc.), Boolean (binary, octate, etc.), alphanumeric strings, textual information, or a combination thereof. In some embodiments, numerals such as 8, ocho, 100-92, square root of sixty four, etc. are symbols that may be used to represent numbers.

In some embodiments, a user may enter a plurality of characters associated with particular information, in order to generate data.

In certain embodiments, at least part of the information received may not be converted to data and may be printed with or near the 3D barcode as text information itself. Examples of such information may include, without limitation, manufacturing dates, part numbers, and serial numbers.

Figure 4:
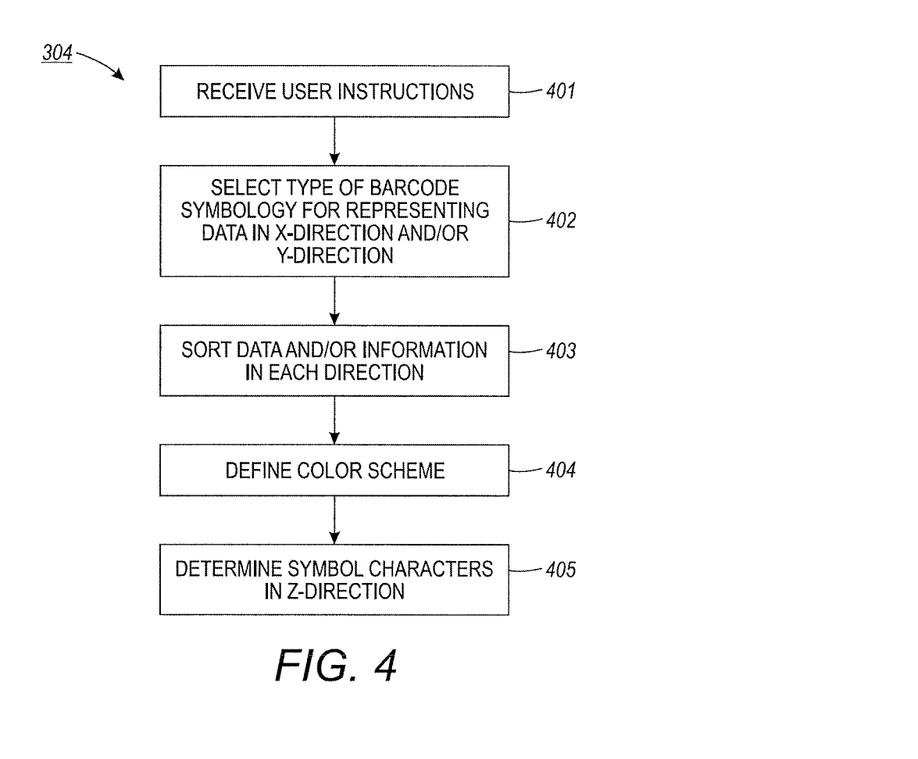
FIG. 4 depicts a flow chart example of a process for determining barcode symbology, according to an embodiment.

In step 304, the system may determine barcode symbology for creating the 3D barcode, as further described in FIG. 4.

As shown in FIG. 4, in step 401, the system may receive user instructions for determination of at least a part of the barcode symbology. Examples of such user instructions may include, without limitation, type of barcode symbology for representing data in the x-direction and/or the y-direction, number of barcodes, types of data to be encoded in the x, y, or z-directions, type of symbol characters, and other such information.

In step 402, the system may select the type of barcode symbology for representing data in the x-direction and/or the y-direction. As discussed above, a user may define by input (such as responding to a prompt generated by the system) the type of barcode symbology for representing data in the x-direction and/or the y-direction. In certain other embodiments, the processor may select the types of barcode symbology in the x-direction and/or the y-direction, based on factors such as geographic location, marking standards, institutional protocols, available footprint size, size limitations of the barcode, and other similar factors. Examples of the types of barcode symbology in the x-direction and/or the y-direction may include Plessey, a Universal Product Code (UPC), Codabar, Code 11, Pharmacode, POSTNET, PostBar, etc.

Determination of the barcode symbology may further include sorting the data and/or information 403 to be embedded in each direction. In some embodiments, the system may receive a set of rules for sorting the data and/or information. In certain other embodiments, the processor may sort the data and/or information based on logic that is pre-programmed into the system, or logic that it may retrieve from a data file. Examples of such logic may include, without limitation: (i) a rule set defining the types of information to be encoded in each direction (e.g., non-public information be encoded in the z-direction only); (ii) a rule set requiring that unencrypted information be encoded in the z-direction; (iii) a rule set requiring encoding non-public information first in the x-direction, then in the y-direction after the data capacity in the x-direction is full, and finally in the z-direction after the data capacity in the y-direction is full. The above logic is by way of example, and other sorting logics are within the scope of this disclosure. In some embodiments, a user may be able to customize the default sorting rules.

In some embodiments, determination of the barcode symbology may further include defining 404 a color scheme to be used in the 3D barcode to increase the data capacity. For example, different colors may be included in the symbol characters for encoding different types of data, in addition to space, height, width and other such factors. The color scheme may be selected based on factors such as the type of scanner, color and/or type of the object and /or the substrate, data capacity, type of information (public or non-public), and the amount of information. It is to be appreciated that when this document uses the term "color," it may include distinctly different colors (i.e., different combinations of CMY) or different shades of a single color (e.g., CMYK). For example, different shades of gray may be employed to add the ability to encode additional data to a barcode or increase the ability of a current symbology to encode additional data.

In step 405, the system may assign symbol characters in the z-direction for each data character or value. In an embodiment, symbol characters in the z-direction may include one or more elements to represent characteristics of physical representations such as height and/or depth of the physical representations, shape of the physical representations (circular, square, rectangular, cylindrical, etc.), dimensions of the physical representations, and spacing between physical representations. Examples of physical representations may include, without limitation, pits and raised areas on the surface of an object and/or a substrate to be affixed on an object.

The symbol characters may be assigned based on factors such as type of barcode symbology in the x-direction and/or y-direction and their respective size limitations, geographic location, marking standards, available footprint size, color scheme, amount of information to be encoded in the z-direction, type of information (public or non-public, and/or encrypted or no-encrypted), type of 3D printer, type of scanner, type of object and/or substrate, visible or invisible z-dimension, and other similar factors. The processor may assign the symbol characters based on logic that is pre-programmed into the system, or logic that it may retrieve from a data file. Example of such logic may include, without limitation, rule sets: (i) defining the maximum number of elements and maximum space for each symbol character based on the amount of information and the available foot print; (ii) defining the range of height, depth, width, or spacing of physical representations in the symbol characters based on at least the type of scanner to be used and its resolution, (iii) defining the range of height, depth, width, or spacing of physical representations in the symbol characters based on at least the resolution of the 3D printer; (iv)

defining the range of height, depth, width, or spacing of physical representations in the symbol characters based on at least whether or not the data may be visible to the human eye; (v) defining the range of height, depth, width, or spacing of physical representations in the symbol characters based on the symbology in the x-direction and or y-direction; and (vi) imposing constraints on the combinations of shapes, sizes and colors of the physical representations. The above logic is by way of example, and other sorting logics are within the scope of this disclosure. In some embodiments, a user may be able to customize the default sorting rules.

Some examples of symbol characters in the z-direction may include, representing numerical binary values such that the presence of a pit with at least a threshold depth or width represents a zero and the presence of a raised area with at least a threshold height or width represents a one, or vice versa. Or they may be relative, where the pit or raised area of a first depth, width or height range represents a zero; and a second depth, width or height range represents a one. In non-binary systems additional depth or height range may represent additional values. For example, data character such as an "A" may correspond to a symbol character having a pattern of a pair of a rectangular pit of 0.1 mm depth and 0.1 mm width at a distance of 0.2 mm, in the x-direction, from a circular raised area of 0.1 mm height and 0.1 mm diameter. An additional color element may be included to increase the data capacity. For example, the above symbol character in red color may correspond to data character "A," in blue color may correspond to binary character "0," in green color may correspond to data character "B," and so on. The above assignment of symbol characters is arbitrary, and is made simply for exemplary purposes.

The sequence of steps in FIG. 4 is by way of example, and other sequences are within the scope of this disclosure without deviating from the principles of this disclosure.

Referring back to FIG. 3, the processor may generate 305 and save 306 to a computer readable memory a set of programming instructions (or a data set to be used in an instruction template) that provide a build sequence for creating the 3D barcode by encoding data based on the determined barcode symbology directly on an object or on a substrate to be affixed on the object.

In some embodiments, the barcode symbology may further be stored in a location external to the 3D barcode, for reference by a scanner for retrieving information from a 3D barcode created using the barcode symbology. A link to the location may be encoded within the 3D barcode. In certain other information, the barcode symbology may be encoded in the 3D barcode itself.

In step 307, the system may transmit the build sequence to any known 3D printer to create the 3D barcode by encoding data in accordance with the predetermined symbology.

Finally in step 308, the 3D printer may print the 3D barcode with the encoded information, in accordance with the build sequence including the barcode symbology. This may be any now or hereafter known 3D printing process, such as where the printer builds an object over a substrate using multiple layers of build material. As the printer builds the object from the substrate up, it may leave cavities (pits) or add raised areas on external surfaces to create the 3D barcode, in addition to the traditional one-dimensional and two-dimensional barcodes. In some embodiments, the z-dimension of the 3D barcode may be printed using a 3D printer and the x-dimension and y-dimension may be printed using traditional barcode printers.

Figure 5:
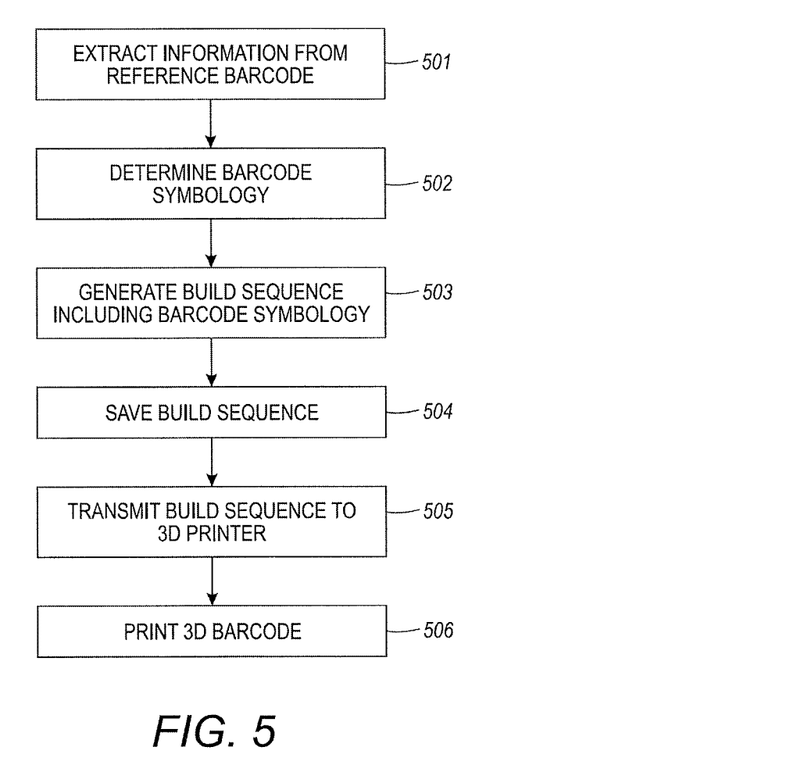
FIG. 5 depicts a flow chart example of a process for generating a build sequence for a 3D object and printing a 3D barcode on the object.

In an alternate embodiment, the system may create a 3D barcode in accordance with the method described in FIG. 5. In step 501, the system may directly extract data to be included in a 3D barcode from a reference one-dimensional and/or two-dimensional barcode. The system may use any known methods to extract the data. Examples of such methods may include, without limitation, optical scanners for one-dimensional barcodes and any electronic device having a camera for a two-dimensional barcode.

In some embodiments, the system may then create a 3D barcode, to embed the extracted data, using the method described above with respect to FIG. 3 and FIG. 4, starting at step 304. Additional information may be included in the 3D barcode in accordance with the principles described above.

In certain other embodiments, the system may determine a barcode symbology 502 such that the elements of the reference one-dimensional and/or two-dimensional barcode are represented as the variable height elements of the 3D barcode in the z-direction. For example, a one-dimensional barcode includes information represented as bars of varying thickness and the white spaces between the bars (in the x-direction). The system may create a barcode symbology such that the varying thickness of the bars may be represented as differing heights of elements of a 3D barcode (raised areas and/or pits) created on the surface of the object or the substrate. The spacing between the raised areas and/or the pits may be the same as the reference barcode. Similarly, the elements of a two-dimensional barcode may be converted to height elements of a 3D barcode. Examples of this will be shown in FIGS. 6A and 6C. Thus, the 3D barcode created in accordance with this method may be invisible to the human eye and can only be read using a 3D scanner. Hence, the system may convert a visible one-dimensional and/or two-dimensional barcode to an invisible 3D barcode. Or, the system may create a visible 3D barcode that includes more data than a typical 1D or 2D barcode could hold.

In certain embodiments, the system may embed additional information in the 3D barcode by including a color element in the barcode symbology, as discussed above with respect to FIG. 4. In other embodiments, the system may generate single-color barcode that is not visible to the unaided human eye but which may be read by a scanner that can detect height differences in the barcode elements.

The processor may then generate 503, and save 504 to a computer-readable memory a set of data and/or instructions that make up a build sequence for creating the 3D barcode by encoding data based on the determined barcode symbology directly on an object or on a substrate to be affixed on the object. In step 505, the system may transmit the build sequence to any known 3D printer to create the 3D barcode by encoding data in accordance with the predetermined symbology. Finally in step 506, the 3D printer may print the 3D barcode with the encoded information, in accordance with the build sequence including the barcode symbology, as discussed above.

Figure 6A:
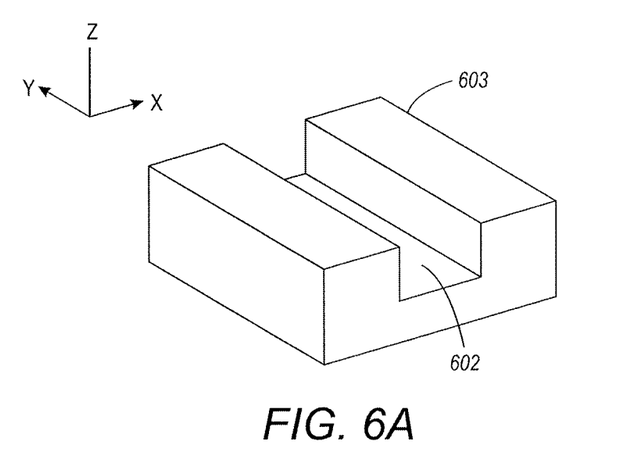
FIGS. 6A-6D illustrate example structures of three dimensional barcodes produced according to an embodiment.
Figure 6B:
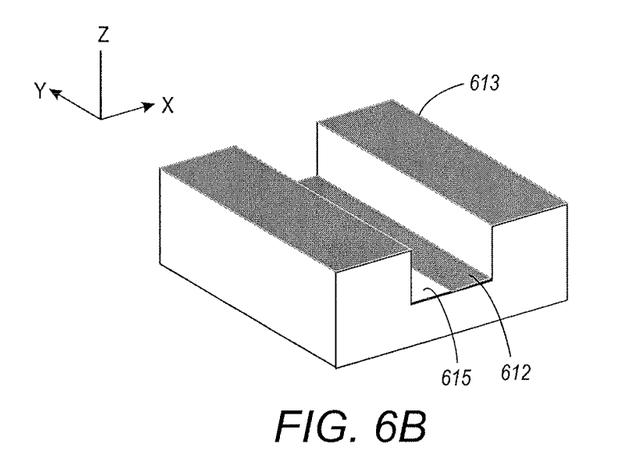

FIGS. 6A-6D illustrate examples of 3D barcodes created in accordance to the principles of the current disclosure. FIGS. 6A and 6B illustrate pits and raised areas added to traditional one dimensional barcodes in the z-direction with varying widths, shapes and spaces. In the example of FIG. 6A, the system has converted a 1D barcode into a 3D barcode of a single color by (1) converting the 1D barcode's first color elements (e.g., black bars) into a first height representation (e.g., raised elements 603 projecting toward the z-direction), (2) converting the 1D barcode's second color elements (e.g., white spaces between the black bars)

into a second height representation (e.g., pits 602). The system may maintain the relative width of each of the elements in order to preserve data that the width represents. The system may save this data to a data file, which the 3D printer will use to print the 3D barcode on a 3D object or substrate. In this context, the term "raised areas" and "pits" refers to the relative heights of the two levels. A "raised area" will typically be printed flush or only slightly above the surface of a 3D object or substrate, and a "pit" may be printed flush or only slightly below the surface of the 3D object or substrate. The relative height differential is such that it is imperceptible to the unaided human eye, but detectable by a 3D scanner. In this way, the 3D scanner may detect the height and width of each element and decode the 3D barcode as if it were a 1D barcode.

In the example of FIG. 6B, a 3D barcode of at least two colors is shown. In this example, the system has converted a 1D barcode along with supplemental data into a 3D barcode of a two colors by (1) converting the 1D barcode's first color elements (e.g., black bars) into a first height representation (e.g., raised elements 613), (2) converting the 2D barcode's second color elements (e.g., white spaces between the black bars) into a second height representation (e.g., pits 602); and (3) augmenting at least one of the height representations with an additional color (e.g., white space 615 in pit 612) that represents additional encoded data. The system may maintain the relative width of each of the 1D barcode's elements in order to preserve data that the width represents, and the additional color elements may be included within that width or (as shown) with a width of their own. The system may save this data to a data file, which the 3D printer will use to print the 3D barcode on a 3D object or substrate. In this way, the 3D scanner may detect the height and width of each element and decode the 3D barcode as if it were a 1D barcode, and it may also detect the additional color elements and use the location, width, and height of the additional color elements to decode the additional data.

Figure 6C:
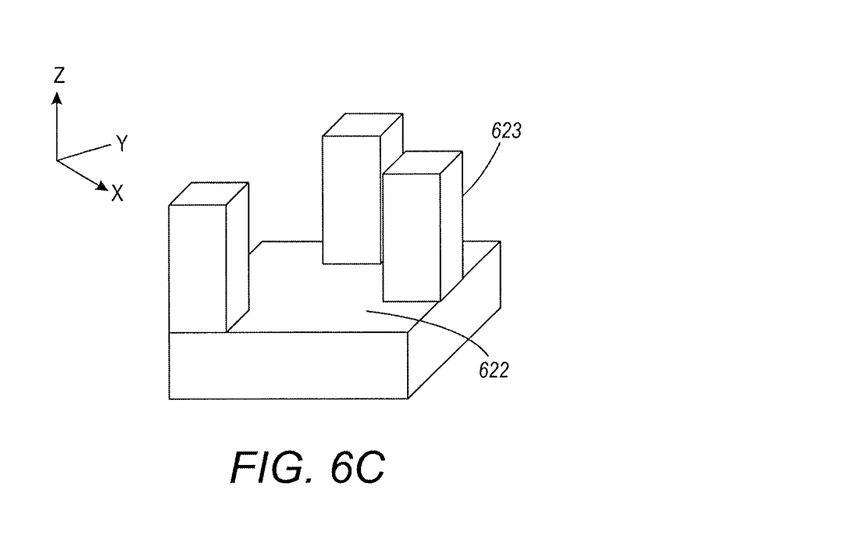

In the example of FIG. 6C, the system has converted a 2D matrix barcode into a 3D barcode of a single color by (1) converting the 2D barcode's first color elements (e.g., black pixels) into a first height representation (e.g., upper height level elements 623 projecting toward the z-direction), (2) converting the 2D barcode's second color elements (e.g., white pixels) into a second height representation (e.g., lower height level elements 622). The system may maintain the relative width of each of the elements in order to preserve data that the width represents. The system may save this data to a data file, which the 3D printer will use to print the 3D barcode on a 3D object or substrate. The relative height differential between the raised (upper level) elements 623 and pits (lower level elements) 622 is such that it is imperceptible to the unaided human eye, but detectable by a 3D scanner. In this way, the 3D scanner may detect the location of each element and decode the 3D barcode as if it were a 2D barcode.

Figure 6D:
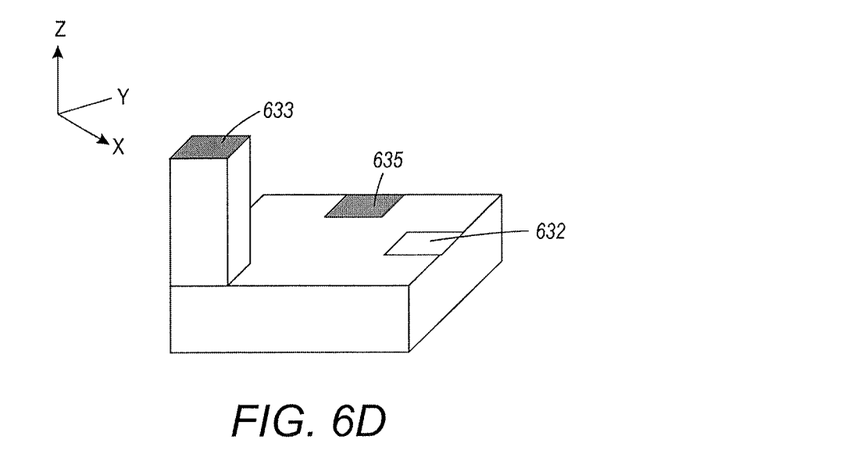

In the example of FIG. 6D, a 3D barcode of at least two colors is shown. In this example, the system has converted a 2D barcode along with supplemental data into a 3D barcode of a two colors by (1) converting the 2D barcode's first color elements (e.g., black pixels) into a first height representation (e.g., upper level elements 633), (2) converting the 2D barcode's second color elements (e.g., white pixels) into a second height representation (e.g., lower level element 632); and (3) augmenting at least one of the height representations with an additional color (e.g., black pixels 635 at the lower level) that represents additional encoded data. The system may thus augment one or more of the 2D barcode's pixels with a different color in order to add more data to the barcode. The system may save this data to a data file, which the 3D printer will use to print the 3D barcode on a 3D object or substrate. In this way, the 3D scanner may detect the location of each element and decode the 3D barcode as if it were a 2D barcode, and it may also detect the additional color elements and use the location of the additional color elements to decode the additional data.

Figure 7:
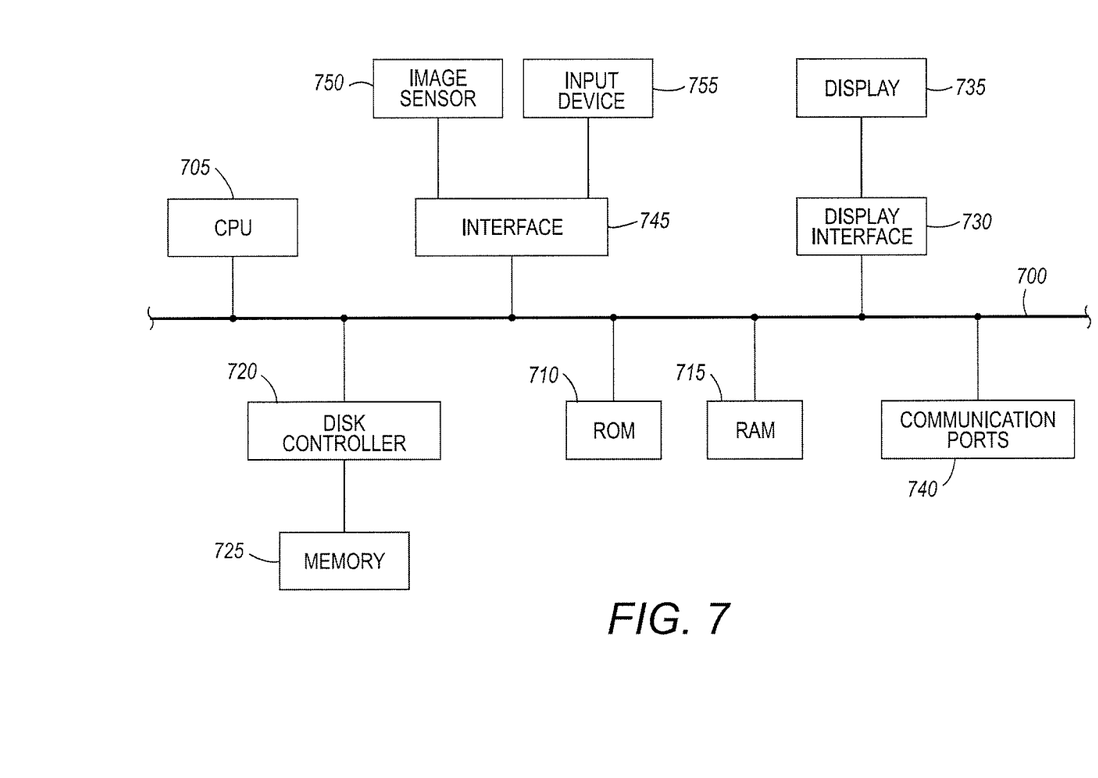
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of an electronic device, computing device or processor as such terms are used within this disclosure. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

The invention claimed is:

1. A three-dimensional barcode comprising a three-dimensional barcode structure, at least a part of which is printed on an outer surface of an object, wherein:

the barcode structure comprises encoded information; and the part of the barcode structure printed on the outer surface of the object is printed in a z-dimension perpendicular to the outer surface of the object, wherein:

a first portion of the encoded information comprises
   first bars of a first height with respect to the outer
   surface,
a second portion of the encoded information comprises
   second bars of a second height with respect to the
   outer surface,
the first bars and second bars exhibit a single color, and
the first height and the second height are close enough
   to each other so that the barcode structure may be
   detected by a 3D scanning device but is imperceptible to an unaided human eye.

2. The barcode of claim 1, wherein:
the first bars and the second bars exhibit a first color; and
a third portion of the encoded information comprises bars
   of a second color positioned at either the first height or
   the second height with respect to the surface.

3. The barcode of claim 1, wherein:
a third portion of the encoded information comprises third
   bars of a first color;
a fourth portion of the encoded information comprises
   fourth bars of a second color; and
heights of the third bars and the second fourth bars are
   close enough to each other so that the barcode structure
   may be detected by a 3D scanning device but is
   imperceptible to an unaided human eye.

4. The barcode of claim 1, wherein:
the first portion of the encoded information comprises first
   pixels represented as structures of the first height with
   respect to the outer surface; and
the second portion of the encoded information comprises
   second pixels represented as structures of the second
   height with respect to the outer surface.

5. The barcode of claim 4, wherein:
the structures of the first height and the structures of the
   second height exhibit a first color; and
a third portion of the encoded information comprises
   structures of a second color positioned at either the first
   height or the second height.

6. The barcode of claim 1, wherein information embedded in the part of the barcode structure printed in the z-dimension comprises non-public information.

7. The barcode of claim 6, wherein the non-public information includes at least one of the following: information relating to printing of an object, information relating to printing of parts of an object, secondary manufacturing information, or information defining the sequencing of parts in manufacturing an object.

8. The barcode of claim 1, wherein the information embedded in the part of the barcode structure printed in the z-direction comprises unencrypted information.

9. The barcode of claim 1, wherein the part of the three-dimensional barcode that is printed on the outer surface of the object comprises at least one of the following: a two-dimensional barcode symbol or a one-dimensional barcode symbol.

10. The barcode of claim 1, wherein the information embedded in the part of the three-dimensional barcode that is printed on the outer surface of the object comprises public information.

11. The barcode of claim 10, wherein the public information includes at least one of the following: a part number, part identification information, inventory information, user manual, safety information, or licensing information.

12. The barcode of claim 1, wherein the information embedded in the part of the three-dimensional barcode that is printed on the outer surface of the object comprises encrypted information.

13. The barcode of claim 1, wherein the z-dimension perpendicular to the outer surface of the object corresponds to raised areas on the surface of the object.

14. The barcode of claim 1, wherein the z-dimension perpendicular to the outer surface of the object corresponds to pits inside the object.

15. The barcode of claim 1, wherein the z-dimension perpendicular to the outer surface of the object comprises bars of one or more of the following shapes: cylindrical, square, rectangular, or conical.

16. The barcode of claim 1, wherein the z-dimension perpendicular to the outer surface of the object represents numerical binary values.

17. A three-dimensional barcode comprising a three-dimensional barcode structure, at least a part of which is printed on an outer surface of an object, wherein:
the barcode structure comprises encoded information; and
the part of the barcode structure printed on the outer
   surface of the object is printed in a z-dimension perpendicular to the outer surface of the object, wherein:
   a first portion of the encoded information comprises
      first bars of a first height with respect to the outer
      surface,
   a second portion of the encoded information comprises
      second bars of a second height with respect to the
      outer surface,
   the first bars and the second bars exhibit a first color,
      and
   a third portion of the encoded information comprises
      bars of a second color positioned at either the first
      height or the second height with respect to the
      surface.

18. The barcode of claim 17, wherein:
a fourth portion of the encoded information comprises
   fourth bars of a first color;
a fifth portion of the encoded information comprises fifth
   bars of a fifth color; and
heights of the fifth bars and the sixth bars are close enough
   to each other so that the barcode structure may be
   detected by a 3D scanning device but is imperceptible
   to an unaided human eye.

19. The barcode of claim 17, wherein:
the first portion of the encoded information comprises first
   pixels represented as structures of the first height with
   respect to the outer surface;
the second portion of the encoded information comprises
   second pixels represented as structures of the second
   height with respect to the outer surface; and
the first height and second height are close enough to each
   other so that the barcode may be detected by a 3D
   scanning device but is imperceptible to an unaided
   human eye.

20. The barcode of claim 17, wherein:
the first portion of the encoded information comprises first
   pixels represented as structures of the first height with
   respect to the outer surface; and
the second portion of the encoded information comprises
   second pixels represented as structures of the second
   height with respect to the outer surface.

21. The barcode of claim 17, wherein information embedded in the part of the barcode structure printed in the z-dimension comprises non-public information.

22. The barcode of claim 21, wherein the non-public information includes at least one of the following: information relating to printing of an object, information relating to printing of parts of an object, secondary manufacturing information, or information defining the sequencing of parts in manufacturing an object.

23. The barcode of claim 17, wherein the information embedded in the part of the barcode structure printed in the z-direction comprises unencrypted information.

24. The barcode of claim 17, wherein the part of the three-dimensional barcode that is printed on the outer surface of the object comprises at least one of the following: a two-dimensional barcode symbol or a one-dimensional barcode symbol.

25. The barcode of claim 17, wherein the information embedded in the part of the three-dimensional barcode that is printed on the outer surface of the object comprises public information.

26. The barcode of claim 25, wherein the public information includes at least one of the following: a part number, part identification information, inventory information, user manual, safety information, or licensing information.

27. The barcode of claim 17, wherein the information embedded in the part of the three-dimensional barcode that is printed on the outer surface of the object comprises encrypted information.

28. The barcode of claim 17, wherein the z-dimension perpendicular to the outer surface of the object corresponds to raised areas on the surface of the object.

29. The barcode of claim 17, wherein the z-dimension perpendicular to the outer surface of the object corresponds to pits inside the object.

30. The barcode of claim 17, wherein the z-dimension perpendicular to the outer surface of the object comprises bars of one or more of the following shapes: cylindrical, square, rectangular, or conical.

31. The barcode of claim 17, wherein the z-dimension perpendicular to the outer surface of the object represents numerical binary values.

32. A three-dimensional barcode comprising a three-dimensional barcode structure, at least a part of which is printed on an outer surface of an object, wherein:
the barcode structure comprises encoded information; and
the part of the barcode structure printed on the outer surface of the object is printed in a z-dimension perpendicular to the outer surface of the object, wherein:
a first portion of the encoded information comprises first bars of a first color,
a second portion of the encoded information comprises second bars of a second color, and
heights of the first bars and the second bars are close enough to each other so that the barcode structure may be detected by a 3D scanning device but is imperceptible to an unaided human eye.

33. The barcode of claim 32, wherein:
a third portion of the encoded information comprises first pixels represented as structures of a first height with respect to the outer surface;
a fourth portion of the encoded information comprises second pixels represented as structures of a second height with respect to the outer surface;
the structures of the first height and the structures of the second height exhibit a single color; and
the first height and second height are close enough to each other so that the barcode may be detected by a 3D scanning device but is imperceptible to an unaided human eye.

34. The barcode of claim 32, wherein:
the structures of the first height and the structures of the second height exhibit a third color; and a fifth portion of the encoded information comprises structures of a fourth color positioned at either the first height or the second height.

35. The barcode of claim 32, wherein information embedded in the part of the barcode structure printed in the z-dimension comprises non-public information.

36. The barcode of claim 35, wherein the non-public information includes at least one of the following: information relating to printing of an object, information relating to printing of parts of an object, secondary manufacturing information, or information defining the sequencing of parts in manufacturing an object.

37. The barcode of claim 32, wherein the information embedded in the part of the barcode structure printed in the z-direction comprises unencrypted information.

38. The barcode of claim 32, wherein the part of the three-dimensional barcode that is printed on the outer surface of the object comprises at least one of the following: a two-dimensional barcode symbol or a one-dimensional barcode symbol.

39. The barcode of claim 32, wherein the information embedded in the part of the three-dimensional barcode that is printed on the outer surface of the object comprises public information.

40. The barcode of claim 39, wherein the public information includes at least one of the following: a part number, part identification information, inventory information, user manual, safety information, or licensing information.

41. The barcode of claim 32, wherein the information embedded in the part of the three-dimensional barcode that is printed on the outer surface of the object comprises encrypted information.

42. The barcode of claim 32, wherein the z-dimension perpendicular to the outer surface of the object corresponds to raised areas on the surface of the object.

43. The barcode of claim 32, wherein the z-dimension perpendicular to the outer surface of the object corresponds to pits inside the object.

44. The barcode of claim 32, wherein the z-dimension perpendicular to the outer surface of the object comprises bars of one or more of the following shapes: cylindrical, square, rectangular, or conical.

45. The barcode of claim 32, wherein the z-dimension perpendicular to the outer surface of the object represents numerical binary values.

46. A three-dimensional barcode comprising a three-dimensional barcode structure, at least a part of which is printed on an outer surface of an object, wherein:
the barcode structure comprises encoded information; and
the part of the barcode structure printed on the outer surface of the object is printed in a z-dimension perpendicular to the outer surface of the object, wherein:
a first portion of the encoded information comprises first pixels represented as structures of a first height with respect to the outer surface,
a second portion of the encoded information comprises second pixels represented as structures of a second height with respect to the outer surface,
the structures of the first height and the structures of the second height exhibit a single color, and
the first height and second height are close enough to each other so that the barcode may be detected by a 3D scanning device but is imperceptible to an unaided human eye.

47. The barcode of claim 46, wherein:
the structures of the first height and the structures of the second height exhibit a first color; and a third portion of the encoded information comprises structures of a second color positioned at either the first height or the second height.

48. The barcode of claim 46, wherein information embedded in the part of the barcode structure printed in the z-dimension comprises non-public information.

49. The barcode of claim 48, wherein the non-public information includes at least one of the following: information relating to printing of an object, information relating to printing of parts of an object, secondary manufacturing information, or information defining the sequencing of parts in manufacturing an object.

50. The barcode of claim 46, wherein the information embedded in the part of the barcode structure printed in the z-direction comprises unencrypted information.

51. The barcode of claim 46, wherein the part of the three-dimensional barcode that is printed on the outer surface of the object comprises at least one of the following: a two-dimensional barcode symbol or a one-dimensional barcode symbol.

52. The barcode of claim 46, wherein the information embedded in the part of the three-dimensional barcode that is printed on the outer surface of the object comprises public information.

53. The barcode of claim 52, wherein the public information includes at least one of the following: a part number, part identification information, inventory information, user manual, safety information, or licensing information.

54. The barcode of claim 46, wherein the information embedded in the part of the three-dimensional barcode that is printed on the outer surface of the object comprises encrypted information.

55. The barcode of claim 46, wherein the z-dimension perpendicular to the outer surface of the object corresponds to raised areas on the surface of the object.

56. The barcode of claim 46, wherein the z-dimension perpendicular to the outer surface of the object corresponds to pits inside the object.

57. The barcode of claim 46, wherein the z-dimension perpendicular to the outer surface of the object comprises bars of one or more of the following shapes: cylindrical, square, rectangular, or conical.

58. The barcode of claim 46, wherein the z-dimension perpendicular to the outer surface of the object represents numerical binary values.

59. A three-dimensional barcode comprising a three-dimensional barcode structure, at least a part of which is printed on an outer surface of an object, wherein:
the barcode structure comprises encoded information; and
the part of the barcode structure printed on the outer surface of the object is printed in a z-dimension perpendicular to the outer surface of the object, wherein:
a first portion of the encoded information comprises first pixels represented as structures of a first height with respect to the outer surface,
a second portion of the encoded information comprises second pixels represented as structures of a second height with respect to the outer surface,
the structures of the first height and the structures of the second height exhibit a first color, and
a third portion of the encoded information comprises structures of a second color positioned at either the first height or the second height.

60. The barcode of claim 59, wherein information embedded in the part of the barcode structure printed in the z-dimension comprises non-public information.

61. The barcode of claim 60, wherein the non-public information includes at least one of the following: information relating to printing of an object, information relating to printing of parts of an object, secondary manufacturing information, or information defining the sequencing of parts in manufacturing an object.

62. The barcode of claim 59, wherein the information embedded in the part of the barcode structure printed in the z-direction comprises unencrypted information.

63. The barcode of claim 59, wherein the part of the three-dimensional barcode that is printed on the outer surface of the object comprises at least one of the following: a two-dimensional barcode symbol or a one-dimensional barcode symbol.

64. The barcode of claim 59, wherein the information embedded in the part of the three-dimensional barcode that is printed on the outer surface of the object comprises public information.

65. The barcode of claim 64, wherein the public information includes at least one of the following: a part number, part identification information, inventory information, user manual, safety information, or licensing information.

66. The barcode of claim 59, wherein the information embedded in the part of the three-dimensional barcode that is printed on the outer surface of the object comprises encrypted information.

67. The barcode of claim 59, wherein the z-dimension perpendicular to the outer surface of the object corresponds to raised areas on the surface of the object.

68. The barcode of claim 59, wherein the z-dimension perpendicular to the outer surface of the object corresponds to pits inside the object.

69. The barcode of claim 59, wherein the z-dimension perpendicular to the outer surface of the object comprises bars of one or more of the following shapes: cylindrical, square, rectangular, or conical.

70. The barcode of claim 59, wherein the z-dimension perpendicular to the outer surface of the object represents numerical binary values.

* * * * *